Patented Aug. 1, 1950

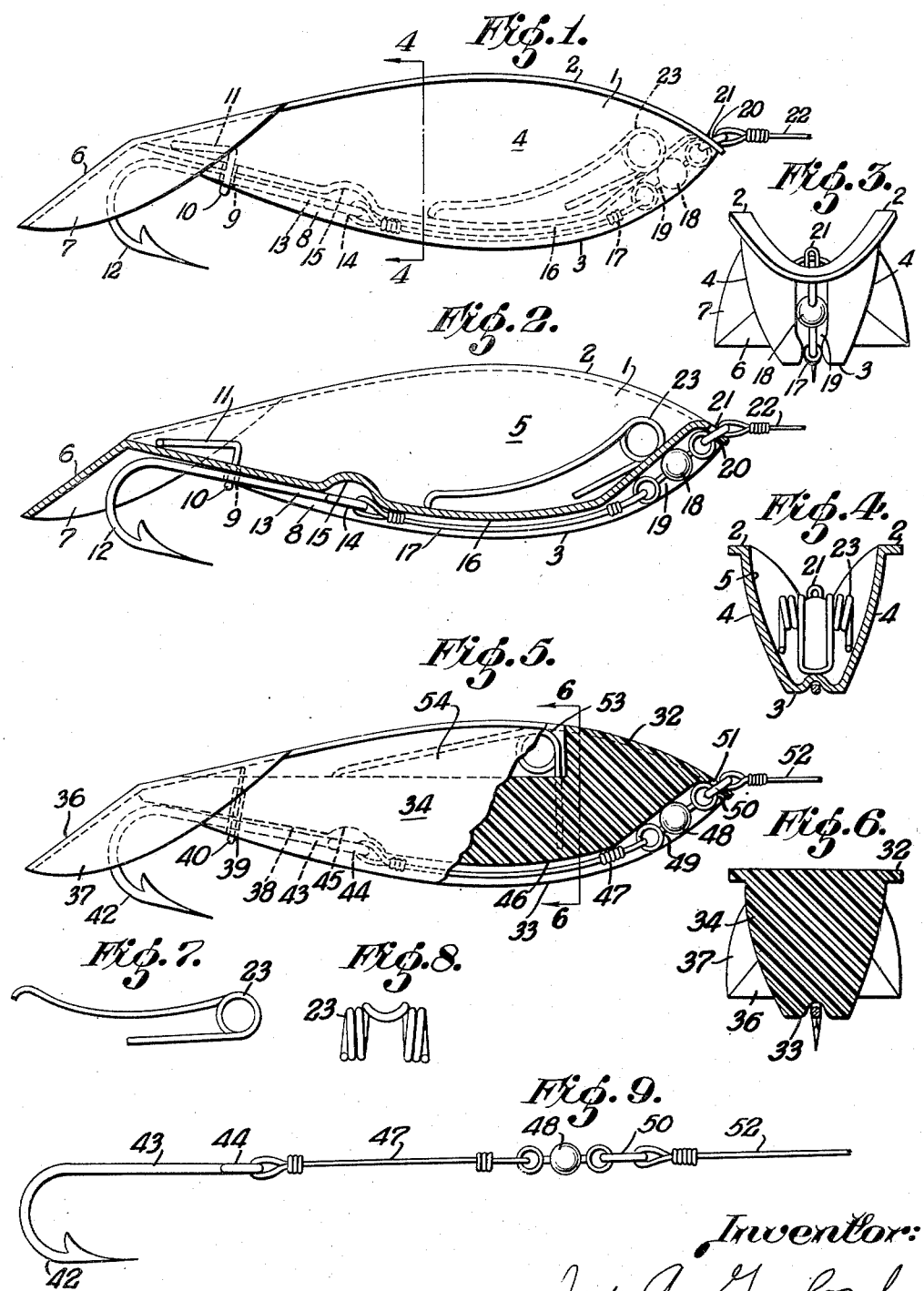

2,517,299

UNITED STATES PATENT OFFICE 2,517,299

FISH LURE

Jay A. Gaylord, Seattle, Wash.

Application February 4, 1948, Serial No. 6,212

1 Claim. (Cl. 43—42.36)

This invention relates to fishing lures and, more specifically to the wobbling or swimming type of lures.

One object of the invention is to provide a lure which has the appearance and movements of a fish as viewed from most angles presented to a fish in the water. Reference is made to application Serial Number 662,637, filed April 16, 1946, in which I made claim for this type of body.

Another object of the invention is to provide a lure with a hook assembly partly concealed in the bottom wall.

A still further object is to provide a lure with an upwardly open, U-shaped cross-section form of body, having a fold and indents formed in the bottom wall surface, adapted to accommodate a hook assembly.

A still further object of the invention is to provide a lure with a line-way formed as circular eyelet at forward end of lure, which allows the lure to shift along the line to a position of safety when a fish is caught on hook, thereby removing the weight of the lure from hook, which the fish may have used to shake the hook from its mouth if the hook were secured to the body of the lure.

A still further object of the invention is to provide a lure with the hook loosely held by its retainer, which allows said hook to freely swing from side to side, thereby through inertia the hook tends to remain in the same relative position while the lure in turning on its side, rotates around the shank of said hook located in its channel, which prevents the hook from damping or slowing down the movement of the lure to turn on its side.

A further object of the invention is to provide a lure with an upwardly open U-shaped cross-section type of body, having a resilient clip within the hollow body for retaining a portion of bait fish as a scent attraction.

A further object of the invention is to provide a lure with a solid body, having a cavity formed in the upper surface with resilient clip located therein for securing a portion of bait fish as a scent attraction.

Further objects may be revealed as the description proceeds.

In the drawings:

Figure 1 is a side elevation of a hollow, U-shaped cross-section type of lure.

Figure 2 is a vertical longitudinal section of Figure 1.

Figure 3 is a front elevation of the forward end of lure.

Figure 4 is a cross-section taken on line 4—4 of Figure 1.

Figure 5 is a side elevation, partly in section of a solid body type of lure.

Figure 6 is a cross-section taken on line 6—6 of Figure 5.

Figure 7 is a side elevation of the resilient clip for securing a portion of bait fish as a scent attraction.

Figure 8 is a front elevation of Figure 7.

Figure 9 is a strung-out view of the hook-assembly.

In the drawings, Figures 1 to 4 denotes a lure which can be formed of metal or moulded of plastic material and in which a body portion is indicated by the numeral 1, 2 are flanges which project laterally from both sides of the upper longitudinal outline and produce the diving tendency of the lure, 3 is the bottom wall surface which causes the lure to rise, 4 is the outer side wall surfaces, 5 is the inner side wall surface which cooperate in preventing the lure from rotating around its longitudinal axis, 6 is a tail extending obliquely, rearwardly from the rear end of said body 1, 7 are bracing flanges joining the sides of said tail 6 with rear portions of flanges 2, 8 is fold formed in rear portion of bottom wall 3, 9 are a slot in each side wall of wall channel 8, 10 are fold rounded ends of a resilient clip which releasably upholds the shank 13 of a hook 12 in fold 8, 11 is the resilient clip, 14 is the eye of said hook 12, 15 is an indent formed to clear the eye 14 so it will not strike the bottom wall as it turns from side to side, 16 is a fold connected to said indent 15 and trends forwardly along said bottom wall 3 to connect with a recess 19 at the forward end of said lure adapted to accommodate a line coupler 18 located therein, 17 is measured length of leader connected at one end to said eye 14 of hook 12, the opposite end of leader 17 is connected with the lower end of said swiveled-coupler 18 and said leader 17 is located in fold 16, 20 is a chafing ring connected to the upward end of line-coupler 18 and projects upwardly through line-way 21, said chafing-ring 20 prevents chafing of line 22 which is connected with that portion of chafing-ring 20 which projects upwardly, 23 is a resilient clip secured forwardly within the hollow body 1 for retaining a portion of bait fish as a scent attraction. Figures 5 and 6 denotes a solid body type of lure in which the dive flanges are 32, bottom wall 33, outer side wall surface 34, tail surface 36, flanges bracing tail 37, channel in bottom surface 38, a slot in each side wall of fluting 39, rounded ends of a resilient clip 40, clip 41, hook 42, shank of hook 43, eye of hook 44, dentate 45, fluting connecting with dentate 46, 47 is a leader, 48 is a swivelled-coupler, 49 is a swivel-coupler recess, 50 is a chafing-ring, 51 is a line-way, 53 is resilient clip for securing a portion of bait fish and 54 is a cavity formed in the upward portion of lure for retaining a portion of bait fish.

The hollow U-shaped cross-section form of lure may be stamped from sheet metal while the solid form of the lure can be moulded of plastic or wood material. In operation the solid body type is substantially the same as the open body type. In operation a portion of bait fish is placed under the resilient clip and the lure is placed in the water and trolled, as it is trolled the bottom wall tends to cause the lure to curve upward in the water, forcing the tail into the water stream which causes the lure to become unbalanced and turn on its side, in which position the water is directed to one of lure and the lure shifts around so that it is in angular position in relation to line of troll, in which position the rising ability of lure is lessened and the pressure on tail is relieved and the diving ability of dive-flanges comes into action and the lure returns on a curved angular course to its initial position upright on line of troll, where the pressure of water again strikes the tail and due to the momentum of previous action it turns to the opposite side and the operations are repeated, thus as the lure is trolled along it alternately turns from side to side and also displaces angularly, closely resembling the movements of a swimming fish. When a fish is caught on the hook, the hook assembly is released from its concealed position and as the fish dashes ahead shaking its head, the lure shifts along line to a position of safety thereby also removing the weight of the lure from the hook which the fish may have had to shake the hook from its mouth if the hook were fixed to the body of the lure. After fish is removed from hook the hook assembly may be replaced in its concealed position and the lure is ready to fish again. The hook is loosely held in its retaining clip which allows it to swing freely from side to side and through inertia tends to remain in the same position, as the lure turns on its side, it turns around the shank of the hook in its channel, the barb and point portion of the hook swinging to the same side as the one on which the lure turns, thereby preventing any damping or slowing of the movements of said lure to turn on its side. The hook and other necessary parts are covered with a coating of resilient material to prevent the hook from creating a clattering noise that is alarming to fish, by striking against the bottom wall of the lure.

NOTE.—I also made claim for covering hook and other necessary parts with a coating of resilient material in application #6,211, filed on same date, now abandoned.

I claim:

A fish lure comprising a body simulating a fish having lateral flanges extending from both sides throughout the length of the body and merging in the forward edge of the body to define an extension from the body, the flanges being spaced at the extension to define a slot, a tail at the rear of the body extending obliquely and downwardly from the longitudinal axis of the body and rearwardly from the end thereof, the flanges at the rear end of the body merging into the tail and providing therewith outwardly flaring sides, said body having in its bottom wall a longitudinally extending groove, and said groove at its forward end being inclined upwardly to the slot provided by the flanges, the body being downwardly recessed from its upper edge to provide a hollow, a clip and a bait holder mounted in the hollow, said clip having a portion thereof extending through the bottom wall adapted to hold the shank of a hook, the assembly being such that a leader and hook may be concealed in the groove and covered by the bottom wall, tail and flaring sides, and held therein by said clip and the slot.

JAY A. GAYLORD.

REFERENCES CITED

The following references are of record in the file of this patent:

UNITED STATES PATENTS

| Number | Name | Date |
|---|---|---|
| 1,272,812 | Keister | July 16, 1918 |
| 2,013,898 | Ridenour | Sept. 10, 1935 |
| 2,112,901 | Anderson | Apr. 5, 1938 |
| 2,225,676 | White | Dec. 24, 1940 |
| 2,236,353 | Minser | Mar. 25, 1941 |
| 2,389,883 | Worden | Nov. 27, 1945 |